May 27, 1952 — O. T. HORN — 2,598,260
WEIGHING AND SACKING MACHINE
Filed Dec. 26, 1947 — 6 Sheets-Sheet 1

Fig. 1.

Ovid T. Horn
INVENTOR.

May 27, 1952  O. T. HORN  2,598,260
WEIGHING AND SACKING MACHINE
Filed Dec. 26, 1947  6 Sheets-Sheet 2

Ovid T. Horn
INVENTOR.

May 27, 1952  O. T. HORN  2,598,260
WEIGHING AND SACKING MACHINE
Filed Dec. 26, 1947  6 Sheets-Sheet 3

Ovid T. Horn
INVENTOR.

May 27, 1952 O. T. HORN 2,598,260
WEIGHING AND SACKING MACHINE
Filed Dec. 26, 1947 6 Sheets-Sheet 5

Ovid T. Horn
INVENTOR.

May 27, 1952　　　　O. T. HORN　　　　2,598,260
WEIGHING AND SACKING MACHINE
Filed Dec. 26, 1947　　　　6 Sheets-Sheet 6

Ovid T. Horn
INVENTOR.

Patented May 27, 1952

2,598,260

UNITED STATES PATENT OFFICE 2,598,260

WEIGHING AND SACKING MACHINE

Ovid T. Horn, Alamosa, Colo.

Application December 26, 1947, Serial No. 793,801

15 Claims. (Cl. 249—18)

This invention relates to automatic machines for sacking goods in measured quantities determined by weight and it has for its general purpose to provide a machine of this type which is simple, efficient and inexpensive and which may be used for industrial and agricultural products of widely different nature, while requiring only a minimum of attention and labor.

It is therefore an object of the invention to provide a sacking and weighing machine which operates continuously, but weighs and sacks intermittently at short intervals, and delivers the sacks, when filled, for further disposition, said machine being however provided with a single driving means for both the continuous and the intermittently operative mechanisms, the latter being provided with means for returning them into their original position, so that a perfect timing of the operations may take place.

It is a further object of the invention to provide a weighing mechanism limiting the quantity delivered to the sack filling mechanism, by means of an electric switch operated by a weighing scale which initiates a series of purely mechanical operations, resulting ultimately in the return of all mechanisms into their original position and state before such release.

It is a further object of the invention to provide a weighing mechanism which causes intermittent stoppage of the delivery and thereby subdivides the continuous feeding operation into a series of intermittent sack feeding and sack conveying operations, by using an electric release mechanism, operated by the weighing mechanism which initiates the operation of a series of means resulting in the intermittent stoppage of the delivery, in the discharge of the weighed quantities of goods into the sacks, into the transfer of filled sacks to a conveyor and in the operation of said conveyor, ultimately delivering the filled sacks for further disposition.

It is a further object of the invention to provide a driving mechanism which has permanently driven and intermittently driven members coupled and brought into engagement upon operation of the electromagnetic releasing means, controlled by the weighing appliance which intermittently driven members start a series of intermittent and timed operations of members driven by them, ultimately resulting in a return of all members involved in such operations into their initial condition and position.

In addition to these objects of a general nature, a number of more specific objects will be apparent which can only be explained in connection with the detailed specification.

The invention is illustrated in the accompanying drawings showing one embodiment of the invention. It is however to be understood that the embodiment illustrated, is shown by way of example only, and was selected in order to explain the principle of the invention and one of the best modes to apply this principle. It does not represent the sole embodiment of the invention and modifications of this embodiment insofar as they are based on the same principle, are not necessarily departures from the invention.

Figure 1:
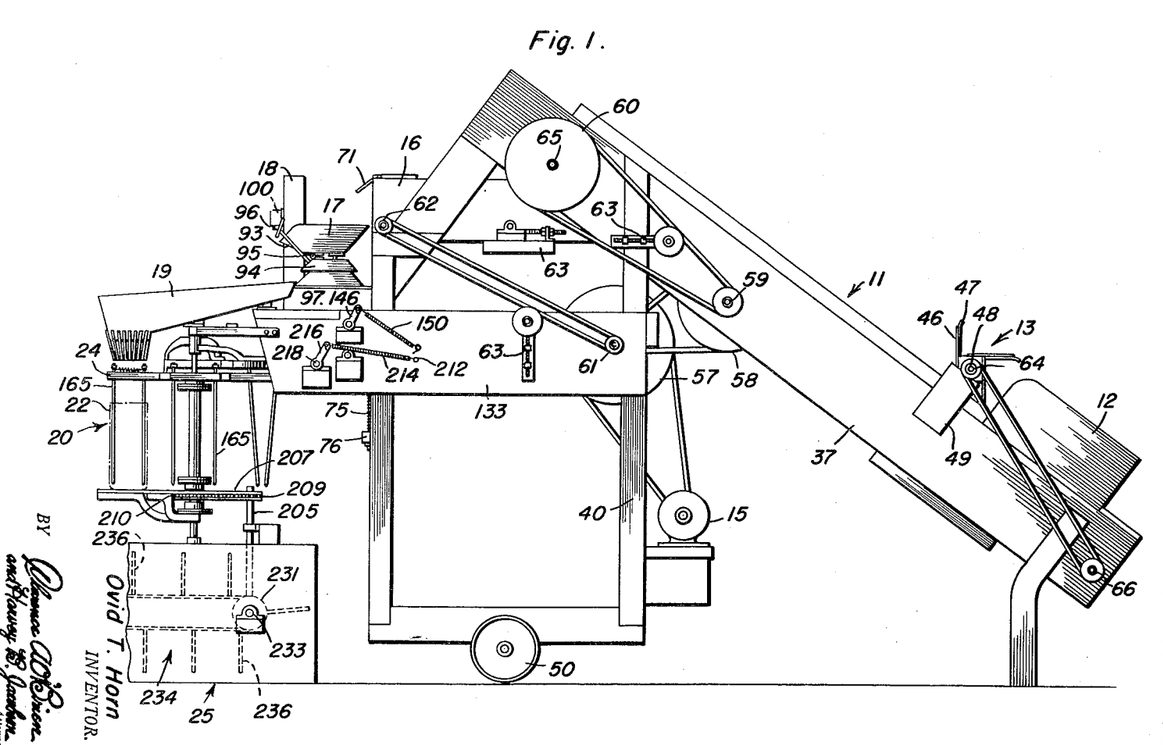
Figure 1 is an elevational side view of the automatic machine.

The weighing and sacking machine as illustrated in Figure 1 consists essentially of a conveyor system generally indicated at 11 provided with a feeding hopper 12 and with means generally indicated at 13 for distributing the goods evenly on the conveyor. This conveyor is driven by means of a system of pulleys and belts by motor 15. The conveyor system delivers its goods through a conveyor housing 16 forming a channel provided with gates into a container or receptacle 17 connected with the weighing scale 18 which controls the aforesaid gates and stops further discharge into the vessel or container 17 when a quantity of a predetermined weight has been delivered.

After completion of the charging and weighing operation, the container or receptacle 17 discharges its contents into the chute and hopper 19 of the sacking mechanism generally indicated at 20 and comprising holders for sacks 22 carried on a turntable 24. The turntable is rotated intermittently and is provided with fresh sacks by an attendant while the sacks filled with goods are delivered to a conveyor generally indicated at 25 which is driven by the turntable 24 and conveys the sacks filled with predetermined quantities of goods to a point from where they may be picked up and shipped by any desired means of transportation.

Figures 2, 3:
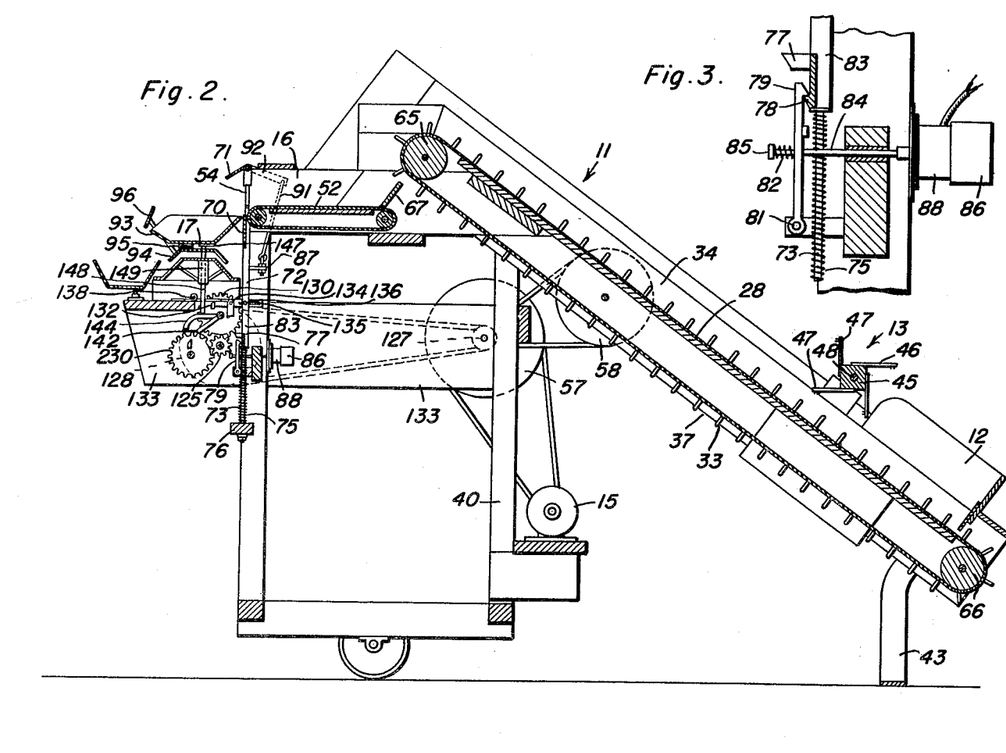
Figure 2 is an elevational sectional side view of that part of the machine which delivers goods to the weighing mechanism.
Figure 3 is a partly sectional elevational detailed view of a mechanism shown in Figure 2.
Figure 9:
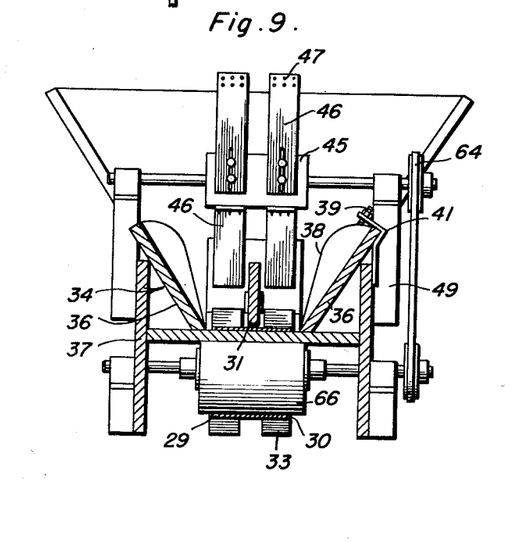
Figure 9 is an end view of the conveyor mechanism illustrated in Figure 2.

As seen from Figure 2 the conveyor system 11 comprises an endless inclined belt conveyor 28 which may consist either of a single belt or of two separate parallel conveyor belts driven conjointly. Separate sections may be formed by a dividing partition strip 31 (Figure 9). This division of the conveyor is of advantage for the transportation of certain goods, while for other goods an undivided conveyor is preferable. The inclined conveyor belt is driven by rollers 65 provided at the upper end and runs over rollers 66. The belts may be provided with transverse cleats or upstanding boards or ledges 33 to facilitate transportation on the inclined belt and to maintain the uniform distribution of the goods along the belt.

The inclined conveyor belt is preferably housed in a frame 37 and runs within a trough 34 with spreading side walls 36 (Fig. 9) which may be provided with lateral adjustable curved guides 38 consisting of metal sheets bent to a varying degree. The adjustment may be made by means of threaded bolts and nuts 39, held on a bracket 41, which are fixed on said sheets. These guides delineate the space within which goods may be carried by the conveyor belt 28 so as to confine the conveyor load to a certain zone, thus avoiding lateral accidental dropping of goods.

At the lower end of the conveyor the hopper 12 is arranged into which the goods to be sacked are delivered by hand or by the desired transportation means. This lower end may be supported by legs 43.

In order to avoid irregular or uneven loading of the conveyor belt a distributing load regulator 13 is provided which consists of a hub member 45 to which steel blades 46 with a rubber lining and a rubber tip 47 are fixed. The hub member 45 is seated on an axle 48 carried by bearings fixed on a bracket 49 which is adjustably supported by the frame 37. The adjustment means for the bracket are not shown and are provided to adjust the height of the load regulator over the belt. The blades push back those excess goods which may have accumulated on the belt and may have reached an excessive height. They distribute the goods more or less evenly in a longitudinal direction and thereby prevent irregularities in the delivery of goods to the other parts of the system.

At the upper end the conveyor belt 28 is carried by a frame structure 49, which in the example shown is provided with wheels 50 to facilitate transport, but which may be fixed and supported by legs where required. This frame supports the driving mechanism and the further mechanisms and appliances to be described below. On its upper end a further horizontally disposed endless conveyor 52 is arranged having one end located below the end of conveyor 28, while its other end is located adjacent a closable opening 54 of a housing forming a channel 16 supported at the upper end of the frame structure 49.

A chute plate 67 may be arranged above the end of conveyor 52 and between it and conveyor 28 so as to convey the goods dropped or discharged from the conveyor 28 to the conveyor 52.

The conveyor system is driven by motor 15 by means of pulleys 57, 58, 59, 60, 61, 62 and belts which may run over belt tensioners 63. The regulator 13 is driven by a pulley 64 and belt driven from the lower conveyor shaft.

The opening 54 is controlled by a main gate shutter 70 and an overflow gate shutter 71, which serve to limit the quantity delivered from conveyor 52 to the receptacle 17. The main gate shutter 70 is carried by a guiding frame 72 which consists of tubular members sliding along guide rods 73. A spring 75 is interposed between said tubular members and a transverse bar 76 of the frame 49 in which the guide rods 73 are fixed. These springs are compression springs having the tendency to move the frame upwardly. The guide frame 72 in addition is provided with a transverse member 83 carrying a projecting lug 77 and a catch 78 for purposes to be described.

The catch 78 cooperates with a pawl 79 which is pivoted at 81 and is subjected to the pressure of a small spring 82 (Figure 3) urging it to engage the catch 78. This spring is wound around a bar 84 provided with a head 85 and is operated by the armature 86 of a solenoid 88. This armature is also under spring tension (not shown in the figure). The spring has the tendency to move the armature 86, the outer cap of which is only shown in Figures 2 and 3, towards the right in these figures and thereby compresses the small spring 82 and keeps the pawl 79 in a position in which it engages catch 78. It will therefore be seen that under normal conditions when no current flows through the solenoid 88, the pawl 79 will engage the catch 78. This pawl is therefore capable of holding the guiding frame 72 and the shutter 70 in its lowermost position against the action of compressed springs 75. However, when the solenoid is energized the core and armature 86 are moved towards the left, disengaging pawl 79 and releasing the frame 72 which moves upwardly. The gate panel 70 moves upwardly with it and the opening 54 is closed by this movement.

Figure 4:
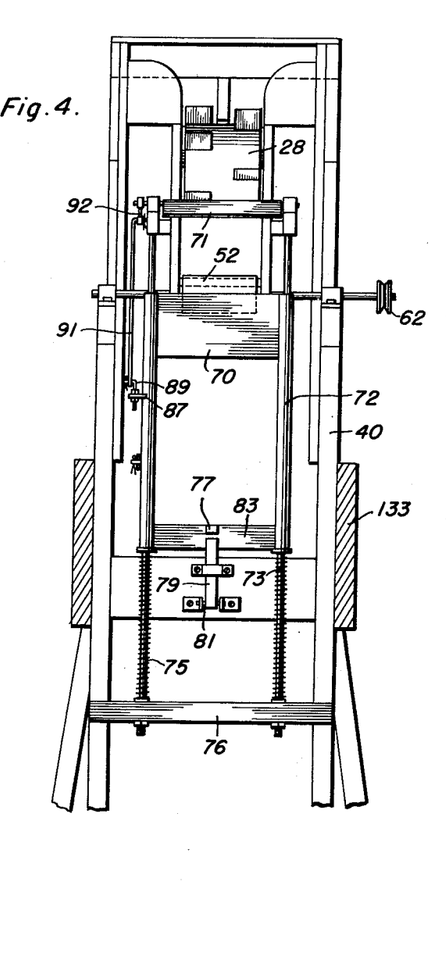
Figure 4 is an elevational end view of that part of the machine which has been shown in Figure 2.

Brackets 87 (Figure 4) are secured to the tubular members of the guiding frame 72 and support links 89 to which a push rod 91 is pivoted. The push rod is linked to the actuating lever 92 of the flap door 71 which serves to prevent an overflow of the goods over the main gate.

In front of the opening 54 the weighing receptacle 17 is placed, with one of its sides forming a chute leading from the opening 54, along which the goods to be weighed and sacked are sliding into the receptacle. The weighing receptacle is moreover provided with a discharge snout 93 and is tiltable on its base member 94. A hinge 95 is provided to permit said tilting movement. A fixed overflow shield 96 may be provided above the snout 93 of the receptacle 17 which is carried by an arm projecting from the base member 94 and which prevents the discharge of goods through the snout when the receptacle rests on its base and is in its filling position.

The base member 94 of the weighing receptacle is connected with the frame of a scale 18 the frame or base of which is shown at 97. This scale is supported by a transverse frame 133 carried by frame 49. It may be of any approved type and differs from customary scales only insofar as the hand or pointer of the scale or an arm connected therewith is provided with means for closing the contacts of a switch 100 when a certain weight indication has been reached. Scales of this type, however, are also well known and need not be described in detail. In the drawings and especially in Figure 10, the pointer, indicator arm or special arm which operates the switch 100 has been indicated at 99.

Figure 10:
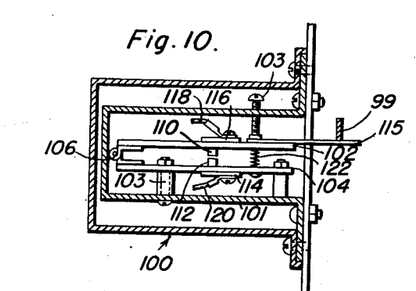
Figure 10 is a sectional elevational view of a switching mechanism operated by the weighing scale.

The switch 100 is illustrated in detail in Figure 10. It comprises a base member 101 in the form of a closed box or sleeve which may be surrounded by a protective housing. The base member 101 carries two insulating movable switch arms 102, 104. The arm 104 is carried by means of the screws 103 provided with spacers while the arm 102 is hinged to arm 104 by means of hinge 106. Each switch arm carries platinum covered contacts 110, 112 respectively, connected with contact plates which are provided with the switch terminals 114, 116 connected with the wires 118, 120.

The switch arm 102 is moreover provided with a metal blade 115 which projects into the scale mechanism and which is engaged by the scale pointer or arm 99 when the latter reaches the predetermined weight indication for which the scale is adjusted and which corresponds to the weight to be discharged into a sack. A small spring 122 holds the two switch arms apart and a back rest for arm 102 is provided by means of screw 105. It will be obvious that when pointer 99 reaches the position corresponding to the weight assigned to a sack it presses blade 115 downwardly (in Figure 10) and thus closes the contacts 110, 112 against the action of spring 122. When the pointer or arm returns the spring 122 separates the contacts and interrupts the circuit of which the switch forms a part.

The tilting mechanism for the weighing receptacle 17 and the release and return mechanism for the sliding frame 72 is operated by means of the gear wheel 125 (Figures 2 and 6) which is driven from the motor 15 by means of pulleys 57, 127 and 128. This gear wheel cooperates with two mutilated gear wheels 130 and 230 of which only the former will now be considered the latter serving a purpose to be described below. The gear wheel 130 carries a stop lug 132 which engages an arm 134 hinged at 138 to the transverse frame 133 and provided with a slot 135 which engages a pin 136 on sliding frame 72. It will be clear from Figure 2 that when said frame is in its lower position in which the pawl 79 engages catch 78 the end of the arm 134 engages the stop lug 132 and prevents the gear wheel from rotating. In this position the mutilated part of the gear wheel 130 faces the driving gear wheel 125 and the wheels are therefore out of engagement.

Figure 5:
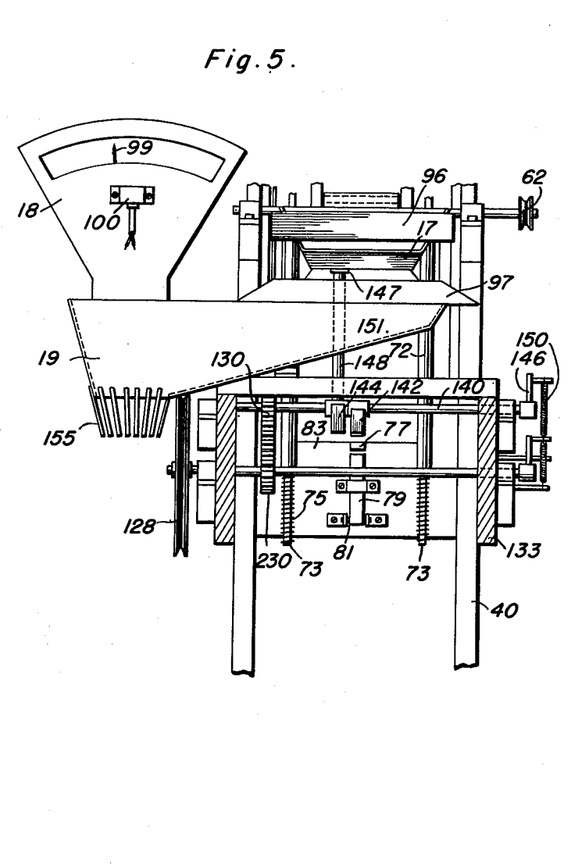
Figure 5 is an elevational end view of the weighing mechanism located adjacent to the mechanism shown in Figure 2.

The gear wheel 130 is mounted on a shaft 140 carrying three arms. Arm 142 (Figure 5) cooperates with projecting lug 77 and is located in the middle. Arm 144 is a curved lifting arm as seen in Figure 2 and cooperates with a tilting rod 148 passing through a guide sleeve 149 fixedly mounted on frame 97 and provided with a rounded head which is applied against a push plate 147 mounted on the bottom of weighing receptacle 17. When the shaft turns in a clockwise direction the arm engages the tilting rod 148 and lifts it, thereby lifting that side of the receptacle 17 which is turned toward the opening 54 and tilting the said receptacle around its hinge 95. The curved part of the arm holds the tilting rod 148 in its tilted position for a certain time, after which, upon further rotation, the arm 144 will leave the tilting rod which will fall back under its own weight. A suitable collar or other stop for holding and stopping the tilting rod is provided but is not shown in the drawing.

The third arm 146 on shaft 140 is connected with a spring 150 (Figures 1 and 5) which is fixed to the transverse frame 133 and which is under tension, when the arm is held in the position which corresponds to that position of the gear wheel in which the stop arm 134 engages stop lug 132. The spring provides the initial drive upon release of the stop lug 132 which is necessary to move the gear wheel 130 through the mutilated section so that its teeth engage those of gear wheel 125. It will be clear that once such engagement took place the spring will be carried around and will be alternatively released and tensioned, finally remaining in its tensioned state upon re-engagement of arm 134 and stop lug 132.

Behind the tilting receptacle 17 a chute 151 (Fig. 6) leads to the hopper 19 of the sacking mechanism 20 which is provided with a downwardly directed discharge opening 154 through which the predetermined quantity or number of goods may be discharged into the sacks. This opening 154 is preferably encircled by steel springs 155 spaced around the discharge opening and converging to some extent so as to form a discharge cone with expansible sides. These steel openings reduce the size of the discharge opening proper and make it expansible so as to prevent clogging or congestion in the discharge opening 155. The flow of goods therefore is uninterrupted.

The sacking device consists of a turntable 24 which comprises a central disk 162 from which a number of sack holding frames 164 are projecting, four being shown in the drawing (Figure 7) in the four main positions a, b, c, d which the sacks may occupy during the sack filling, removing, replacing operation. It is however to be understood that, if a larger number of steps is desirable, the number of sack holding frames and the driving mechanism is to be changed accordingly. Each frame 164 holds two pairs of sack expanding blades 165 which are pivoted in the frame near their upper ends and carry eyes 166 close to these ends. The blades of each pair are linked by a tension spring 167 attached to the eyes 166 of the blades. Above the eyes and close to or at the ends of the blades guiding heads 168 are arranged. The four blades of the two pairs are held by the springs in such a position that, between them, they hold a sack 22 which has been slipped over them in a fully expanded state under some tension.

Figure 7:
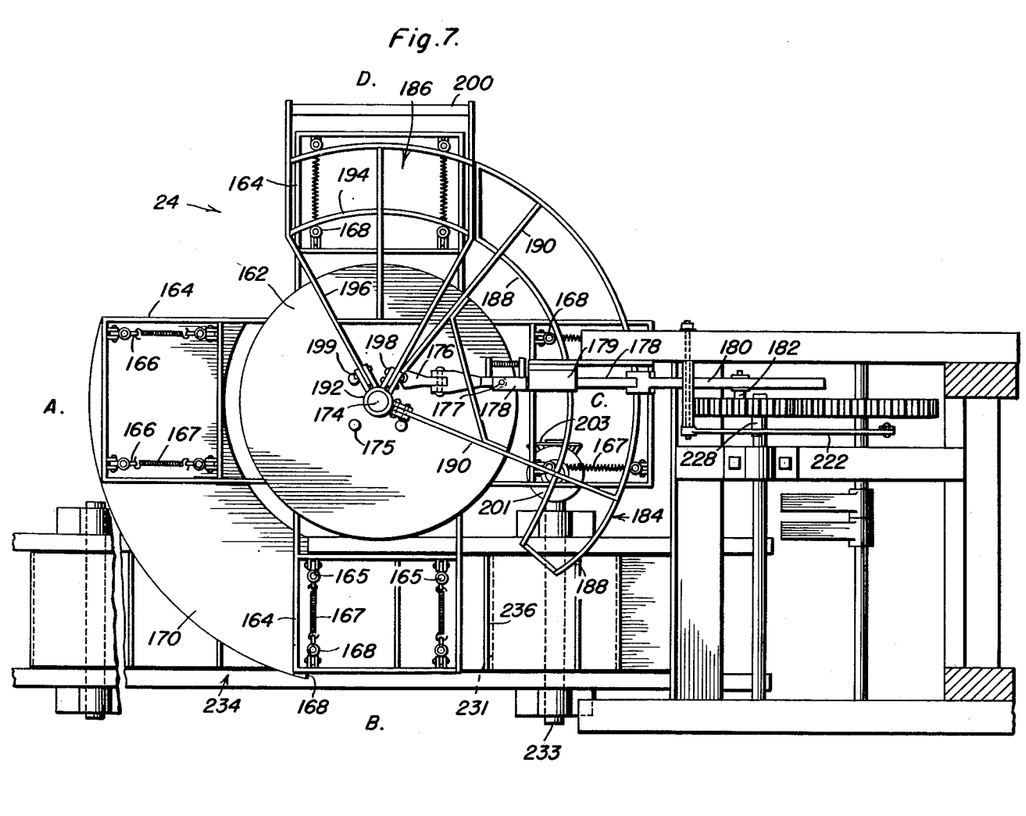
Figure 7 is a plan view of the mechanism shown in Figure 6.

The sack 22 rests on a fixed supporting table 170 supported by arms 172 which project from a sleeve 173 surrounding and holding a shaft 174, which is journalled in suitable bearings and to which the disk 162 of the turntable 24 is keyed.

The supporting table 170 as seen in Figure 7 occupies only a sector and its edge 168 is so positioned that the sack 22 when moved into position b is advanced beyond and clears the supporting table 170. The sack 22 therefore drops under the influence of gravity onto a conveyor as soon as this position has been reached.

The transportation of the sack from one position to the other is effected by means of the turntable 24. For this purpose the turntable is provided with a number of pins 175, four being shown in Figure 7 which move the turntable from one of the four positions a, b, c, d, occupied by the sack 22 into the other. They are arranged on a circle and spaced so as to be at 90° from each other. These pins are pushed by a dog 176 having a head embracing the pins which is linked to a push rod 178 guided and held in a guide sleeve 179. As the rectilinear movement of the dog and the circular movement of the pin do not fully coincide even under the most favorable conditions, in the event that the pin is moved through an arc of 90°, the push rod may be provided with a pivot joint 177 permitting a certain amount of lateral movement of the dog during the movement of the push rod 178.

Figure 8:
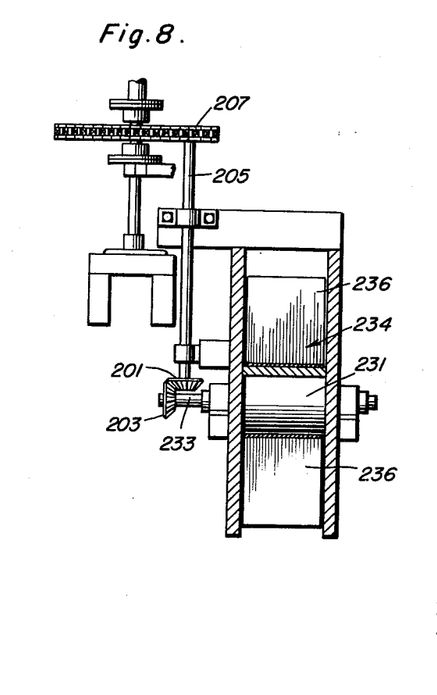
Figure 8 is a detailed plan view of a conveyor mechanism and its drive shown in Figure 7.

The push rod 178 is preferably driven by a connecting rod 180 which is driven by the gear wheel 230 by means of a driving pin 182. As the movement of the dog is preferably intermittent and occurs at relatively long intervals the connecting rod 180 is provided with a slot 181 which permits idle movement of the pin within the slot during part of the rotation of the gear wheel 230.

Figure 6:
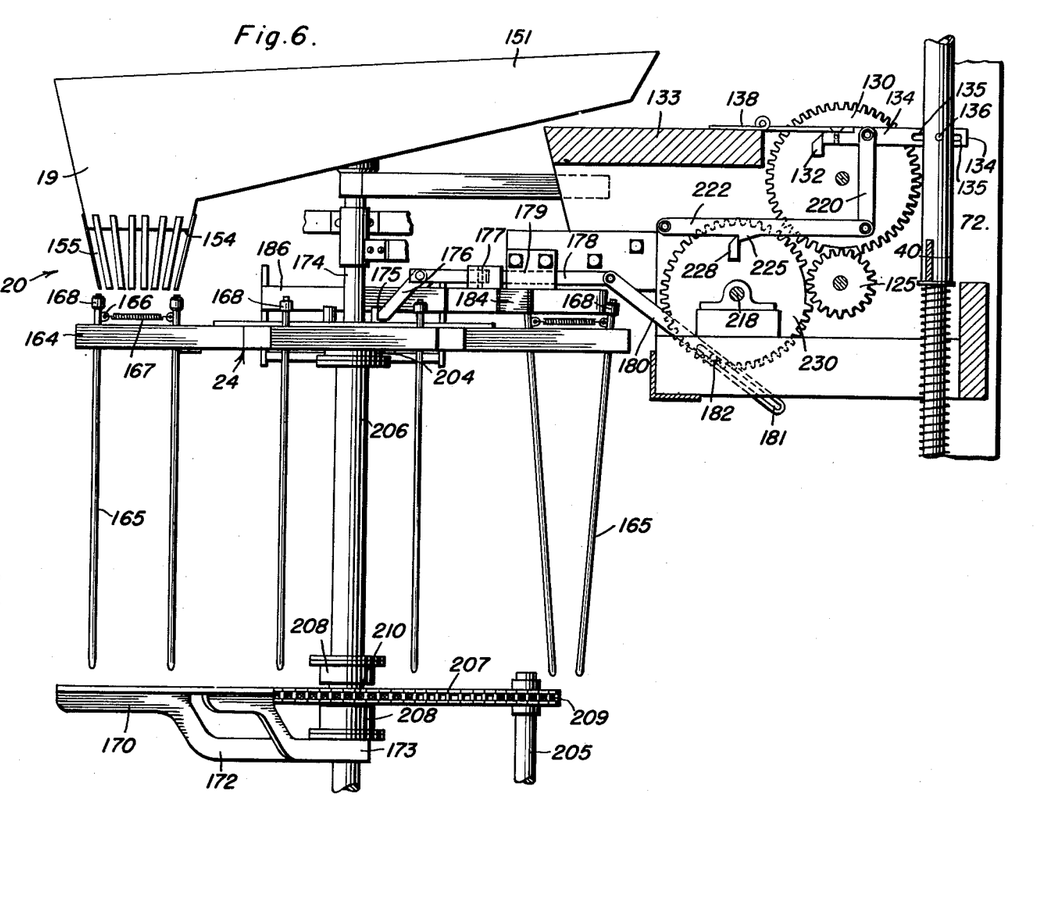
Figure 6 is an elevational partly sectional side view of the sacking mechanism.

The gear wheel 230 is a mutilated toothed wheel adapted to be engaged and to be driven by the toothed gear wheel 125. Wheel 230 is provided with a stop lug 228 which cooperates with a tooth 225 on a stop arm 222. This arm is attached to stop arm 134 fulfilling a similar purpose in connection with toothed wheel 130 by means of link 220. Stop arm 134 as explained has a slotted end portion 135 which engages a pin 136 on slide frame 72. It will thus be clear that the lifting of the slide frame 72 entails not only the lifting of the stop arm 134 and the disengagement of stop 132 but also lifts stop arm 222 by means of link 220 and thereby releases gear wheel 230.

This gear wheel is mounted on a shaft 218 which carries an arm 216 attached to a spring 214 (Figure 1) which in its turn is fixed to a stud 212 on the frame 133. The spring is under tension when the tooth 225 engages the stop lug 228. When the stop lug is released the spring turns the toothed wheel around to the extent necessary to secure engagement of the mutilated wheel 230 with gear wheel 125.

Above the turntable and in such height as to engage the guiding heads 168 are two fixed expansion frames 184 and 186. Expansion frame 184 is arranged along an arc centered above that side of the turntable which has been designated as position c. It comprises two arcuate guide rails 188 and a number of struts 190 for holding them, which are preferably fixedly supported on a sleeve 192 surrounding the shaft 174. The rails 188 are substantially parallel, but their ends converge toward the end of the frame facing the direction of movement. They are so arranged that they occupy the space between the heads 168 of the sack expansion blades 165 when moved towards them. The two converging ends of the rails at the front end of the frame are arranged at a distance smaller than that of the heads 168 of a pair, but their distance increases towards their rear end and therefore the heads start to run on the guiding rails 188 when the frames 164 and blades 165 are moved into position c. Behind the initial stretch the rails are so spaced that their distance is larger than the distance between the heads in position a where the sack is held in an expanded position. The heads 168 are therefore moved away from each other and the sack holding blades move towards each other and are held in this position when the frame 164 of the turntable has been moved to position c and while it is moved to position d.

Above the position marked d, a second expansion frame 186 is arranged, consisting again of two parallel arcuate rails 194 arranged at the same distance at which the rails 188 are arranged so that the rails 194 form a continuation of the rails 188. They are however relatively short and they cover an arc corresponding to the position d. They are arranged on and joined by a number of struts 196 which are connected with the sleeve 192 by means of pivot joints 198 with horizontal pivots 199. Moreover the struts joining the rails 194 are projecting outwardly and carry a handle bar 200, which can be lifted, thus removing the expansion frame 186 from its position between the guiding heads 168. These heads which had been forced apart will therefore move again towards each other under the influence of their springs 167.

The expansion frame 186 is arranged in the station in which the sacks are slipped over the blades and in which the attendant performing this job is stationed. It will be readily seen that the sack holding blades of a sack holding frame 164 when arriving in position d are pressed inwardly so that the sack may be slipped over them without difficulty. The attendant then lifts handle bar 200. The guide heads and the blades therefore snap back under the influence of their spring and hold the sack firmly between them.

The turntable 24 is supported by a thrust bearing disk 204 carried by a sleeve 206 surrounding shaft 174 which is held by means not shown. The shaft is held in bearings 208 supported in any appropriate manner. The shaft 174 carries a sprocket wheel 210 which drives a further wheel 209 by a chain 207. The latter drives a shaft 205 at the end of which a bevel gear wheel 201 is arranged. This gear wheel meshes with a second bevel gear wheel 203 on a shaft 233 which drives the roller 231 of an endless belt conveyor 234. This conveyor is placed directly beneath the supporting table 170 and is provided with two sprocket chains, one at each side of the belt, and between these chains transverse partition walls 236 are supported. These walls are so spaced that they may receive a sack between them. On account of the positive drive of the conveyor and its linkage to the turntable 24 an open compartment will always be found underneath the position b in which the sack drops from the supporting table to the conveyor. Walls at right angle to the transverse walls (not shown) may be attached to the transverse partition walls so that a compartment closed on all sides may be formed in which the sack may be held in every direction. The conveyor 234 carries the sacks to the desired place and may discharge them in any appropriate manner, this discharge being no longer part of or related to the present invention.

The operation of the weighing and sacking machine, as far as not already described is the following:

The goods to be weighed and sacked are fed into the hopper 12 and are carried upwardly by the conveyor 28 between the cleats or partitions 33, the regulator 13 sweeping over the accumulated goods and distributing them more evenly if they tend to accumulate near the cleats.

At the upper end the conveyor 28 dumps the goods onto the conveyor 52 which they reach by passing along chute 67. If the weighing receptacle is assumed to be empty at the time, the goods will be conveyed along conveyor 52 to the opening 54 and from there slide along the chute forming side walls of the receptable 17 into the same. As the receptacle is on the beam of the scale 18, the scale registers the weight of the goods delivered and when the predetermined weight has been reached the pointer 99 (or the arm connected with the pointer) pushes blade 115 and closes contacts 110 and 112. The closing of the switch contacts energizes the solenoid magnet 88, whereby armature 86 is attracted and bar 84 is moved to the left in Figures 2 and 3. This movement withdraws pawl 79 and releases the slide frame, which is under the tension of springs 75. The frame 72 moves upwardly and the gate 70 closes the opening 54, while simultaneously overflow gate 71 is closed by means of push bar 91 and arm 92. The goods during the following short period therefore accumulate behind the closed gates.

The upward movement of frame 72 also lifts arm 134 (Figures 2 and 6) from stop lug 132 and the tension of spring 150 acting on arm 146 brings mutilated toothed wheel 130 into engagement with driving gear 125 permanently driven by means of motor 15 over pulleys 57, 127 and 128. Simultaneously stop arm 222 is lifted and starts an operation to be described below. The movement of gear wheel 130 now engaging wheel 125 rotates shaft 140 and the arms 144, 142 and 146. The curved arm 144 pushes tilting rod 148 upwardly and lifts the rear portion of weighing receptacle 17. This receptacle is tilted and empties its contents into chute 151 and hopper 19, from which they are discharged into a sack. Meanwhile however the gear wheel continues to rotate. The curved arm 144 is moved beyond the tilting rod and the tilting rod 148 drops back, the weighing receptacle falling back into its position of rest. The arm 142, thereafter catches the lug 77 on slide frame 72 and presses the slide frame downwardly. This downward movement again opens the gates 70 and 71 so that the weighing receptacle is again filled.

As switch 100 has been reopened upon the emptying of the receptacle 17 the solenoid magnet becomes de-energized. Therefore the spring (not shown) acting on the armature presses the armature 86 to the right and holds pawl 79 in a position in which it will engage catch 78 as soon as frame 72 is pushed downwardly. Further rotation of wheel 130 disengages arm 142 from lug 77 but the slide frame is held with the springs compressed by catch 78 and pawl 79 so that the slide frame is again ready for action. Further movement of gear wheel brings the mutilated portion of the gear wheel opposite gear wheel 125. Spring 150 has been tensioned in the meantime but is prevented from drawing gear wheel forward and through the sector without teeth because at the point at which this sector faces the gear wheel 125 the stop lug 132 meets arm 134.

The original position has now been completely restored, the receptacle 17 is again in the process of being filled and the weighing operation of the goods in transit to the sacks may be repeated.

Meanwhile the goods discharged from receptacle 17 have passed chute 151 and hopper 19 and have been discharged through opening 154 into a sack 22 held in a spread out or expanded position by the blades 65 in position $a$. The goods fall into the sack, as soon as the receptacle 17 has been tilted. Such tilting, as will be recalled has been started by the lifting of frame 72 which withdrew stop arm 134 from stop lug 132. Simultaneously with the lifting of the stop arm 134 the link 220 and the stop arm 222 is lifted. Thereby stop lug 228 is released and spring 214 acting on arm 216 rotates shaft 218 so as to bring the toothed portion of wheel 230 into engagement with wheel 125. Wheel 230 rotates and operates connecting rod 180 by pin 182, after an interval which has been produced by the fact that the pin first moved idly through the slot. Connecting rod 180 moves push rod 178 which moves dog 176. Dog 176 advances, carrying one of the pins 175 with it, and thereby rotates the disk 162 through 90°. Thereby frame 164 and the sack spreading mechanism holding the sack spread is advanced through 90°. The sack rests on fixed table 170 and when the spreading mechanism on frame 64 moves its bottom resting on the table 170 slides over the table, but the sack moves with the frame. It is carried past the table into position $b$ in which it clears the table and therefore drops down on conveyor 234 into one of the compartments formed between partition walls 236. This conveyor as explained is driven by the turntable 24 the disk 162 of which is keyed on shaft 74. Upon rotation of shaft 74 the sprocket wheels 210, 209, the shaft 205 and the bevel gear wheels 210 and 203 move the rollers of the endless conveyor, the relationship of which to the turntable is therefore permanently maintained.

Upon movement of the sack from position $a$ to position $b$, the frame which was in position $b$ is moved to position $c$. During this rotational movement the rails 188 entered between the heads 168 and drove the heads outwardly. Thereby the sack spreading blades 165 moved inwardly. The frame 164 which happened to be in position $c$ was simultaneously moved to position $d$, the position of the spreading blades 165 remains the same during this movement. When the rotation through 90° is completed the attendant stationed near position $d$, draws a sack over the convergent blades and lifts handle 200, thereby removing the rails 194 from the space between heads 168. The springs 167 therefore draw the heads towards each other and the sack is held between the spreading blades 165. It is carried to position $a$ in an expanded or spread out condition by the next partial rotation of the turntable through 90°.

It will therefore be seen that a continuous filling, weighing and delivery operation is produced, with all the parts of the mechanisms brought back to their original position after each cycle of operations so that the said operation may proceed indefinitely.

It will be understood that the design of many details is of minor importance for the carrying into effect of the invention and that changes in the design will not operate to influence the general principle on which the invention is based.

Having described the invention, what is claimed as new is:

1. In a weighing and sacking machine for filling goods in predetermined quantities into sacks, in combination, a continuously driven feeding conveyor, continuously supplied with goods to be delivered to the sacks and producing a continuous flow of goods, a channel with a closable delivery opening, arranged near the delivery end of the feeding conveyors, said channel being provided with a substantially horizontal continuously moving conveyor, receiving the goods continuously discharged from the feeding conveyor flow controlling and interrupting shutters temporarily shutting said opening, a weighing apparatus provided with a receptacle placed adjacent to said shutter controlled opening, means for operating said shutters controlled by said weighing apparatus, a chute for delivering the weighed quantities of goods to the sacks, means for delivering the weighed goods from the weighing receptacle into the chute, a sack conveying means for bringing empty sacks into position relatively to the chute and for removing the sacks when filled, a filled sack delivery conveyor for collecting and delivering the sacks removed from the filling position, a continuously operative driving means, motion transmission means temporarily coupled with the continuous driving means for intermittently driving the operating means of the flow interrupting gates, further motion transmitting means and coupling means for temporarily coupling the said motion transmitting means with the continuous driving means, said coupling means being controlled by the operating means for the flow interrupting gates, the above motion transmitting means driving the sack conveying means and the sack delivery conveyor.

2. In a weighing and sacking machine for filling goods in predetermined quantities into sacks, in combination, a feeding conveyor system continuously supplied at one end with goods to be delivered to the sacks and producing a continuous flow of said goods, a collecting channel near the delivery end of the feeding conveyor into which the goods carried by the feeding conveyor are delivered, said collecting channel having a closable delivery opening, means for moving the goods in said channel towards said closable delivery opening, gates for temporarily closing said delivery opening so as to cause an interruption of the continuous flow and an accumulation of goods at one side of the said gate, a weighing scale provided with a weighing receptacle below said delivery opening, into which the goods delivered through the said delivery opening are discharged and weighed during an interruption of the flow of goods through the gates, means for controlling the flow interrupting gates, said means being controlled by said weighing mechanism, a chute for delivering the weighed quantities of goods to the sacks, means for delivering the weighed goods from the weighing receptacle into the chute, a sack conveying means for bringing empty sacks into position relatively to the chute and for removing the sacks when filled, a filled sack delivery conveyor for collecting and delivering the sacks removed from the filling position, a continuously operative driving means, motion transmission means temporarily coupled with the continuous driving means for intermittently driving the operating means of the flow interrupting gates, further motion transmitting means and coupling means for temporarily coupling the said motion transmitting means with the continuous driving means, said coupling means being controlled by the operating means for the flow interrupting gates, the above motion transmitting means driving the sack conveying means and the sack delivery conveyor.

3. In a weighing and sacking machine for filling goods in predetermined quantities into sacks, in combination, a continuously moving feeding conveyor, continuously supplied with goods to be delivered to the sacks and producing a continuous flow of goods, a channel with a closable delivery gate surrounding the delivery end of said feeding conveyor, a substantially horizontal continuously moving conveyor in said channel, movable gate shutters controlling the delivery of goods through said closable delivery gate, a weighing apparatus provided with a weighing receptacle, located adjacent said delivery gate for collecting the goods intermittently delivered through the same, a weight indicating means on said weighing apparatus, means for operating the movable gate shutters, controlled by said weight indicating means, means for emptying the receptacle controlled by said gate shutter operating means, a chute for delivering the weighed quantities of goods from the receptacle to the sacks, a sack advancing conveyor for moving the sacks into a filling position relatively to the chute and for moving the sack from said position when filled with goods, a sack discharge conveyor onto which the sacks removed from the filling position are moved, continuous driving means and intermittent driving means, the latter adapted to be coupled temporarily with the continuous driving means under control of the gate shutter operating means and, when coupled, driving the means for emptying the receptacle, the gate shutter operating means, the sack advancing conveyor and the sack delivery conveyor.

4. In a weighing and sacking machine for filling goods in predetermined quantities into sacks, in combination, a continuously moving feeding conveyor, continuously supplied with goods to be delivered to the sacks and producing a continuous flow of goods, a channel with a closable delivery gate surrounding the delivery end of said feeding conveyor, a substantially horizontal continuously moving conveyor in said channel, movable gate shutters controlling the delivery of goods through said closable delivery gate, a weighing apparatus provided with a weighing receptacle, located adjacent said delivery gate for collecting the goods intermittently delivered through the said gates, a weight indicating means on said weighing apparatus, a gate shutter carrier, springs to keep it under tension when clearing the delivery gate, locking means for said gate shutter carrier, means operated by the weight indicator for releasing said locking means, means for emptying said weighing receptacle, controlled by said gate shutter carrier, a chute for delivering the weighed quantities of goods from the receptacle to the sacks, a sack delivery conveyor for delivering the sacks filled with goods, a sack advancing conveyor for moving the empty sacks into a filling position below the chute and the sacks filled with goods to the sack delivery conveyor, continuous driving means and intermittent driving means, the latter being adapted to be coupled temporarily with the continuous driving means, driving the means for emptying the receptacle, the gate shutter, the sack delivery conveyor for delivering the sacks and the sacks advance conveyor for moving the sacks to and from the filling position, said temporary coupling being controlled by the gate shutter carrier and thereby by the weighing mechanism.

5. In a weighing and sacking machine for filling goods in predetermined quantities into sacks, in combination, a continuously moving feeding conveyor means, continuously supplied with goods to be delivered to the sacks and producing a continuous flow of goods, a channel with a closable delivery gate surrounding the delivery end of said feeding conveyor a substantially horizontal continuously moving conveyor in said channel, movable gate shutters controlling the delivery of goods through said closable delivery gate, a weighing apparatus provided with a weighing receptacle, located adjacent to said delivery gate for collecting the goods intermittently delivered through the same, a weight indicating means on said weighing apparatus, a gate shutter carrier, springs to keep it under tension when clearing the delivery gate, locking means for said gate shutter carrier including a catch and pawl mechanism, electromagnetic means for releasing said locking mechanism, an energizing circuit for said electromagnetic means, switch means operated by said weight indicator for controlling the energization of said electromagnetic means, means for tilting said weighing receptacle, controlled by said gate shutter carrier, means for returning the gate shutter carrier into its locked position, said means being controlled by the release of the gate shutter carrier and mechanically connected with the tilting means for the receptacle, a chute for delivering the weighed quantities of goods from the weighing receptacle to the sacks, a sack delivery conveyor for delivering the sacks filled with goods, a sack advancing table for moving the empty sacks into their filling position and for moving the sacks filled with goods to the conveyor means, continuous driving means driving the feeding conveyor and intermittent driving means, the latter adapted to be coupled temporarily with the continuous driving means, and driving the means for emptying the receptacle, the gate shutters, the said sack advancing table and the sack delivery conveyor for delivering the filled sacks, the coupling of said intermittent driving means with the continuous driving means being controlled by said gate shutter mechanism.

6. In a weighing and sacking machine for filling goods in predetermined quantities into sacks, in combination, a continuously moving feeding conveyor means, continuously supplied with goods to be delivered to the sacks and producing a continuous flow of goods, a channel with a closable delivery gate surrounding the delivery end of said feeding conveyor a substantially horizontal continuously moving conveyor in said channel, movable gate shutters controlling the delivery of goods through said closable delivery gate, a weighing apparatus provided with a weighing receptacle, located adjacent said delivery gate for collecting the goods intermittently delivered through the same, a weight indicating means on said weighing apparatus, means for operating the movable gate shutters controlled by said weight indicating mechanism, means for tilting the weighing receptacle, means for returning the gate shutters after operation, a continuous driving means, an intermittently operative driving means for the weighing receptacle tilting means and for said shutter carrier return means, adapted to be coupled temporarily with the continuous driving means, a locking means on said last named driving means controlled by the gate shutter, means for effecting a coupling between the continuous and the intermittently operative driving means upon unlocking of said locking means, a chute for delivering the weighed goods to the sacks, a sack delivery conveyor for delivering the sacks filled with goods, a sack advancing conveyor for moving the sacks onto their filling position and for moving the sacks filled with goods to the sack delivery conveyor, and means for driving the last named conveyors intermittently adapted to be coupled with the continuous driving means, said coupling being controlled by the gate shutter operating means.

7. A weighing and sacking machine, as claimed in claim 6 wherein, the continuous driving means includes a toothed gear wheel and the intermittently operative driving means comprises a mutilated gear wheel, a shaft rotated thereby, an arm on said shaft, and a spring attached to said arm.

8. A weighing and sacking machine as claimed in claim 7 wherein the locking mechanism comprises a stop lug on said mutilated gear wheel, and a stop arm operated by the gate shutter carrier and adapted to release said stop lug, for engagement with the continuously driving gear wheel.

9. In a weighing and sacking machine for filling goods in predetermined quantities into sacks, in combination, a continuously moving feeding conveyor means, continuously supplied with goods to be delivered to the sacks and producing a continuous flow of goods, a channel with a closable delivery gate surrounding the delivery end of said feeding conveyor a substantially horizontal continuously moving conveyor in said channel, movable gate shutters controlling the delivery of goods through said closable delivery gate, a weighing apparatus provided with a weighing receptacle, located adjacent to said delivery gate for collecting the goods intermittently delivered through the same, weight indicating means on said weighing apparatus, a gate shutter carrier, springs to keep it under tension when clearing the delivery gate, locking means for said gate including a catch and pawl mechanism, electromagnetic means for releasing said locking mechanism, an energizing circuit for said electromagnetic means, switch means operated by said weight indicator for controlling the energization of said electromagnetic means, controlled by said gate shutter carrier, a stop lug on said gate shutter carrier, continuously operated driving means, including toothed wheels, an intermittent driving means for returning the gate carrier after operation, said means including a mutilated gear wheel adapted to be brought into engagement with the continuously driven gear wheel, an arm driven thereby, adapted to engage the stop lug on the gate shutter carrier, means for emptying the receptacle controlled by said gate shutter, carrier, a chute for delivering the weighed quantities of goods to the sacks, a sack delivery conveyor for delivering filled sacks, a sack advancing table for moving the sacks into their filling position and for moving the sacks filled with goods to the sack delivery conveyor, and driving means for the said conveyors, positively coupled with each other and controlled by the gate shutter carrier, which is controlled by the weighing mechanism.

10. In a weighing and sacking machine for filling goods in predetermined quantities into sacks, in combination, a continuously moving feeding conveyor means, continuously supplied with goods to be delivered to the sacks and producing a continuous flow of goods, means for temporarily interrupting said continuous flow of goods, a weighing apparatus, control means for said flow interrupting means, operated by said weighing apparatus, a tiltable receptacle hinged to said weighing apparatus for receiving the goods to be weighed, a tilting mechanism adapted to tilt said receptacle, means to operate said tilting mechanism, controlled by said flow interrupting means, and operated after operation of the latter, a chute for delivering the goods discharged from said receptacle into the sacks to be filled, an endless conveyor for delivering the sacks when filled, a sack advancing table for moving the sacks into their filling positions and for moving the sacks when filled onto the sack delivery conveyor, continuous driving means, means temporarily coupled with said continuous driving means for operating said receptacle discharge controlling means, and further means interlinked with said last named means for driving said sack advancing table and sack delivery conveyors both controlled by the means for interrupting temporarily the continuous flow of goods.

11. In a weighing and sacking machine as claimed in claim 2 in which the sack advancing conveyor comprises a turntable consisting of a central disk and attached frames, each frame provided with sack spreading means, a fixed supporting table of limited length located above the sack discharge conveyor, and means for advancing said turntable.

12. In a weighing and sacking machine for filling predetermined quantities of goods into sacks, a continuously moving conveyor means continuously supplied with the goods to be sacked and producing a continuous flow of goods towards the discharge end, means for delivering the goods into the sacks, a weighing mechanism between said continuous feeding means and said delivery means, said mechanism dividing the continuously fed goods into quantities of equal predetermined weight, means for interrupting the continuous flow of goods temporarily and periodically, controlled by said weighing mechanism, a further discharge conveyor for sacks filled with goods, a rotatable turntable above said discharge conveyor provided with projecting drive members, a driving mechanism provided with continuously driven members, intermittently driven members adapted to be coupled with said continuously driven members, said intermittently driven members consisting of mutilated gear wheels, a stop lug on said gear wheel and a stop arm engaging said stop lug, means connected with the flow interrupting means to operate said stop arm, a push rod connected with and moved by one of said mutilated gear wheels, a push dog, operated by said connecting rod in operative relation to the projecting drive members of the turntable, drive means for the discharge conveyor and means for connecting said drive means with the turntable.

13. In a weighing and sacking machine as claimed in claim 2 wherein the means for delivering the sacks filled with goods to the discharge conveyor include a rotatable turntable consisting of a rotating central disk and of frames attached thereto, sack spreading blades pivotally suspended on said frames and provided with extension heads, a spring between the said spreading blade extensions, and a spreading frame above the turntable for guiding said extension heads and for producing a convergence of the spreading means.

14. In a weighing and sacking machine as claimed in claim 2 wherein the intermittently driven members comprise a mutilated gear provided with a stop lug, an arm controlled by the means for stopping the continuous flow of goods, cooperating with the stop lug of one of the mutilated gears, and holding it in its ineffective position and means for turning said mutilated gear wheel when released.

15. A weighing and sacking machine as claimed in claim 6, wherein the intermittently operative driving means each comprise a mutilated gear wheel, provided with a stop lug, a stop arm cooperating with said stop lug holding said mutilated gear wheel in its inoperative position with respect to the continuous drive, one of said stop arms being controlled and operated by the means for operating the gate shutters, a link between said stop arms to operate the stop arms conjointly and means connected with each mutilated gear wheel to turn the same into an operative position when the stop arm releases the stop lug.

OVID T. HORN.

REFERENCES CITED

The following references are of record in the file of this patent:

UNITED STATES PATENTS

| Number | Name | Date |
|---|---|---|
| 667,560 | Nickerson | Feb. 5, 1901 |
| 675,771 | Eisenhart | June 4, 1901 |
| 931,800 | Reuther et al. | Aug. 24, 1909 |
| 1,507,650 | Woolcott | Sept. 9, 1924 |
| 1,602,578 | Ingram | Oct. 12, 1926 |
| 2,254,384 | Nowak | Sept. 2, 1941 |
| 2,319,908 | Walter | May 25, 1943 |